United States Patent [19]

Good

[11] 4,205,614
[45] Jun. 3, 1980

[54] COMBUSTION FOR RUBBISH AND REFUSE

[76] Inventor: Lewis D. Good, 7579 100th St., Caledonia, Mich. 49316

[21] Appl. No.: 863,255

[22] Filed: Dec. 22, 1977

[51] Int. Cl.² .............................................. F23G 7/00
[52] U.S. Cl. .................................... 110/346; 110/216; 110/259
[58] Field of Search ............... 110/203, 212, 215, 216, 110/224, 227, 228, 234, 254, 243, 259, 346

[56] References Cited

U.S. PATENT DOCUMENTS

| | | |
|---|---|---|
| 490,582 | 1/1893 | McClave . |
| 493,522 | 3/1893 | Robeson . |
| 517,067 | 3/1894 | Richards . |
| 535,292 | 3/1895 | Lance . |
| 942,060 | 12/1909 | Elliott . |
| 1,160,360 | 11/1915 | Atterbury et al. . |
| 1,500,348 | 7/1924 | Tackabery . |
| 1,523,860 | 1/1925 | Coghlan et al. . |
| 1,638,004 | 8/1927 | Schultz . |
| 1,800,689 | 4/1931 | Kerr . |
| 1,861,135 | 5/1932 | Riley . |
| 1,973,705 | 9/1934 | Hardgrove et al. . |
| 2,005,082 | 6/1935 | Greenawalt . |
| 2,084,764 | 6/1937 | Comstantin . |
| 2,297,890 | 10/1942 | Huffschmidt . |
| 2,355,101 | 8/1944 | Norman . |
| 2,957,508 | 10/1960 | Mason . |
| 3,267,890 | 8/1966 | Zinn et al. ............................ 110/216 |
| 3,448,704 | 6/1969 | Dvirka . |
| 3,561,378 | 2/1971 | Fabry ................................... 110/254 |
| 3,675,600 | 7/1972 | Jones ................................... 110/243 |
| 3,707,129 | 12/1972 | Kawashimo et al. ................ 110/228 |
| 3,785,304 | 1/1974 | Stookey ............................... 110/346 |
| 3,861,332 | 1/1975 | Itasaka ................................ 110/259 |
| 3,861,334 | 1/1975 | Stockman . |
| 4,027,602 | 6/1977 | Mott .................................... 110/243 |

FOREIGN PATENT DOCUMENTS

19044 8/1908 Norway .
221831 5/1925 United Kingdom .

OTHER PUBLICATIONS

Drawings Nos. S-506A, S-507A; Western Foundry Co., Feb. 27, 1948 and Mar. 4, 1948.

*Primary Examiner*—Edward G. Favors
*Attorney, Agent, or Firm*—Price, Heneveld, Huizenga & Cooper

[57] ABSTRACT

An incinerator and method for burning both sorted and unsorted rubbish and refuse cleanly and efficiently. Rubbish is inserted in a non-clogging hopper where it is preheated and preliminarily combusted as it moves downwardly to a primary combustion chamber where air is added. A moving grate beneath the primary combustion chamber draws ashes and uncombusted materials downwardly away from that chamber. Gases of combustion are further combusted as they are drawn by the natural draft in the incinerator through a secondary combustion chamber and gas circulating and flyash collecting chamber before exiting through an exhaust. The natural draft through the incinerator is controlled by a series of movable baffles and doors. Steam is inserted into the hopper and secondary combustion areas to enhance combustion of certain rubbish and materials while fresh air heated by the incinerator is added to primary and secondary combustion areas and used to heat the hopper to begin slow combustion in the hopper and to aid later combustion in the said areas.

13 Claims, 12 Drawing Figures

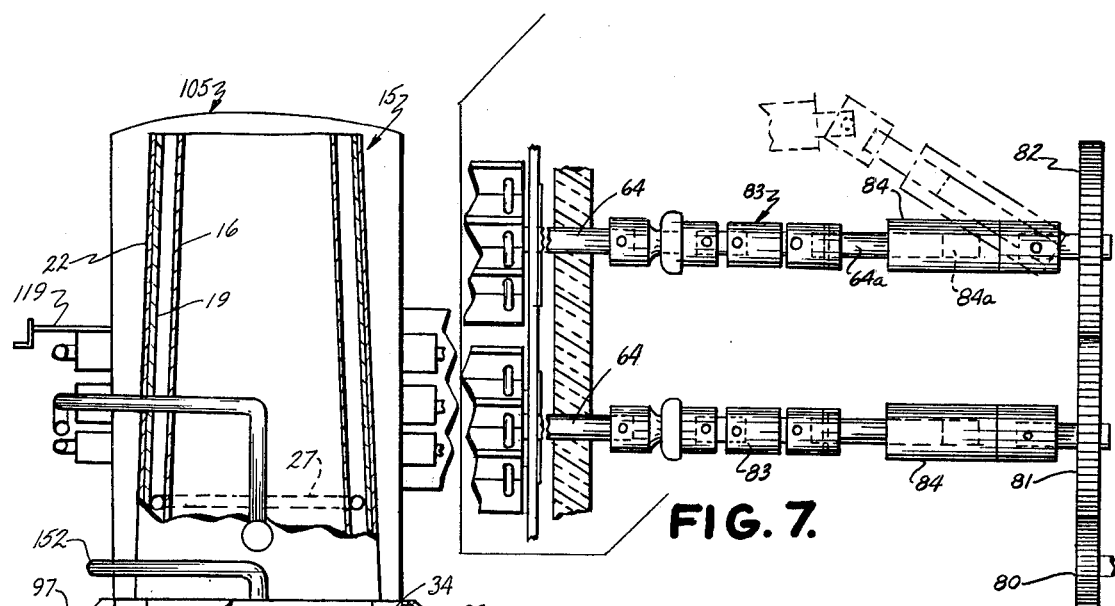
FIG. 7.
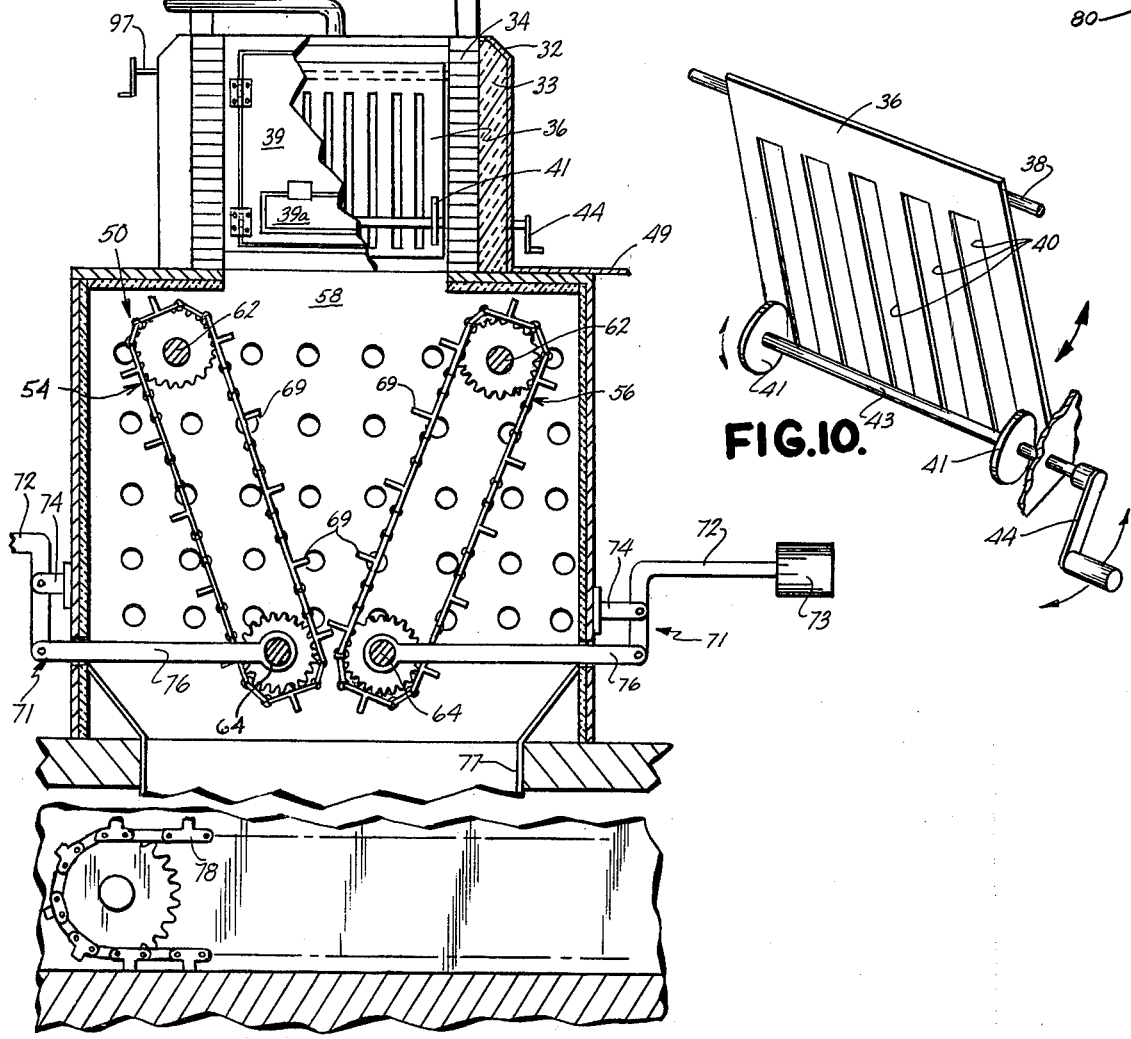
FIG. 10.
FIG. 2.

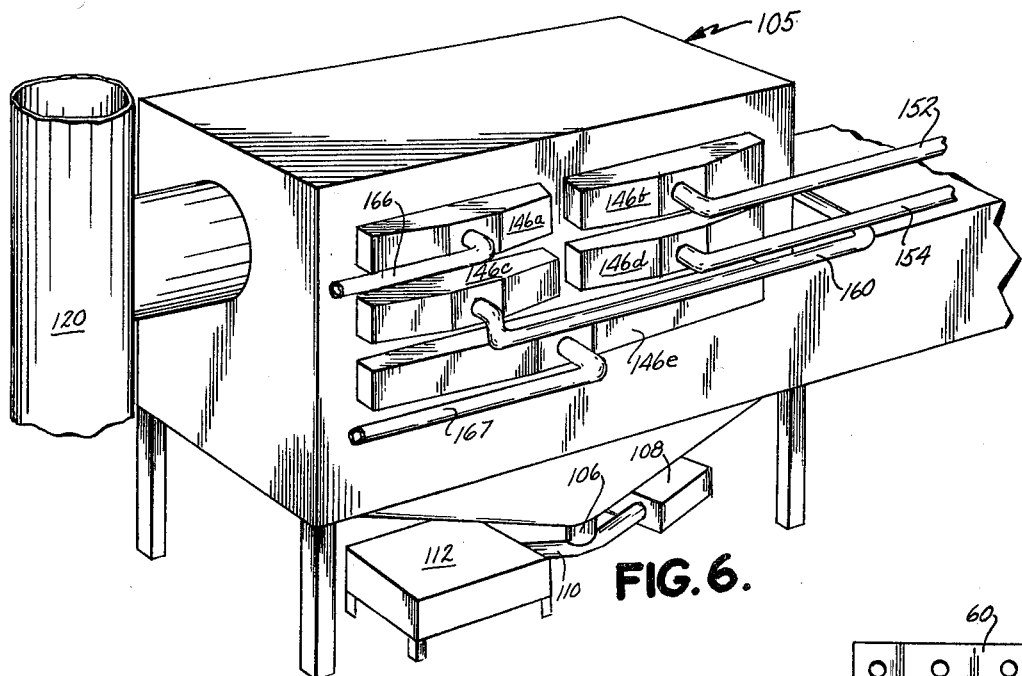
FIG.6.
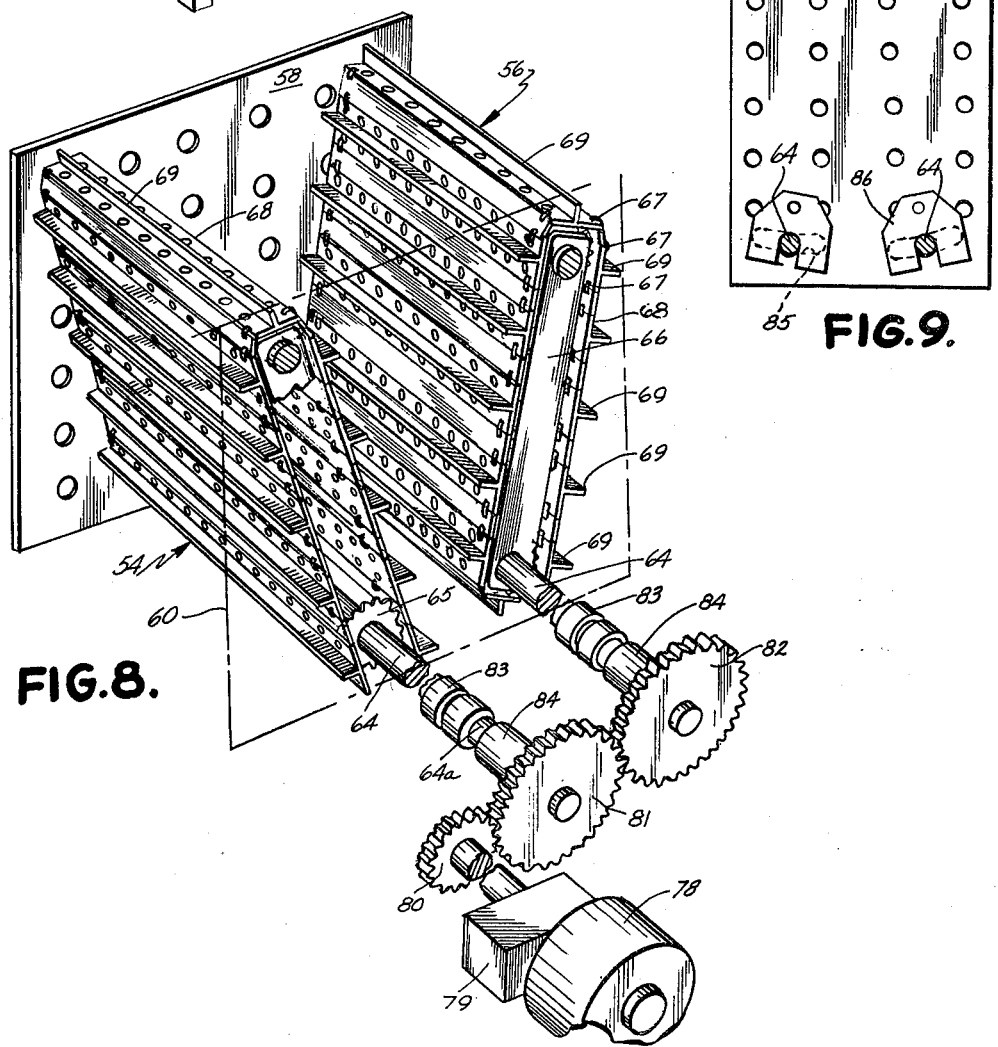
FIG.8.
FIG.9.

COMBUSTION FOR RUBBISH AND REFUSE

BACKGROUND OF THE INVENTION

This invention relates to incinerators and methods for burning rubbish and refuse and, more particularly, to an incinerator and rubbish burning method whereby both sorted and unsorted rubbish and refuse are cleanly and efficiently combusted while uncombustible materials are passed through for reuse.

Incinerators and burning methods for waste, scrap and refuse such as sawdust and the like are well-known. While operating successfully for specific, individual types of waste materials, problems are often encountered with known incinerators and methods in attempting to burn a combination of many types materials as are encountered in modern day rubbish and refuse collected in urban and other areas.

A reoccurring problem with known incinerators has been the incomplete combustion of the varying materials resulting in exhaust pollution and residual waste materials from the incineration. Such incomplete combustion includes a failure to burn gases of combustion as well as incomplete initial combustion of the actual solid waste. In addition, since many non-combustible materials such as glass bottles, metal cans, chunks of cement or cinder blocks and various manufactured items fashioned from metal and other non-combustible or combustion-resistant materials are included with such rubbish, it is necessary for an efficient incinerator and burning method to accommodate such materials. Prior known apparatuses have had difficulty in passing non-combustible materials therethrough or have required time-consuming and expensive sorting or shredding before incineration.

Other problems encountered with prior devices and methods include clogging of the incinerator when attempting to burn varying materials and generally insufficient temperatures to completely combust the various fibers, plastics, paper, fabrics, grease, oils, fats, rubber products and the like which are encountered. Further, prior apparatuses have attempted to burn or combust such materials too quickly also resulting in incomplete combustion and consequent pollution in the exhaust gases.

It has been discovered in developing the present invention that the burning of varying materials requires the enhancement of combustion at various points within the apparatus and process. Prior incinerators and methods have not successfully accomplished such enhancement. Moreover, consistently efficient combustion in high-humidity and other varying weather conditions, and an ability to avoid the use of expensive additional fuels such as natural gas, oil, kerosene or the like are also important in the incineration of rubbish. Such conditions and requirements have limited the usefulness of prior structures.

Accordingly, the need has been present for an efficient, clean-burning rubbish incinerator and combustion method which can handle varying types of rubbish and refuse without prior requiring sorting or shredding and which provides the ability to burn combustible materials and pass through or recycle non-combustible metals and other materials in reuseable form without disruption of the combustion process. The present invention has been developed in recognition of such need and as a solution for the above and other incineration problems.

SUMMARY OF THE INVENTION

Accordingly, the present invention provides a method and apparatus for incineration of rubbish and refuse of the type including varying types of materials including both combustible and non-combustible items without the requirement of prior sorting or shredding. The invention allows continuous insertion and combustion of rubbish in a clean and highly efficient manner so that little or no uncombusted materials are released in the exhaust gases to the atmosphere. The invention allows combustion of burnable materials and removal of both the resulting ashes and any non-combustible materials while the combustion continues and is completed. Resulting gases of combustion are drawn through the incinerator in a controlled manner for further combustion in successive chambers. Flyash is settled out and removed while the heat from the combustion gases is used to form steam and heat air which in turn are returned to portions of the incinerator for enhancement of the combustion process.

In one form of the invention, an incinerator is provided including primary and secondary combustion chambers, a fuel-receiving hopper positioned above and communicating with the primary combustion chamber and an ash-collecting area positioned below the primary combustion chamber in alignment with the hopper. The ash-collecting area includes a grate for receiving ashes and any non-combustible materials. A gas circulating and flyash collecting chamber is located adjacent and communicating with the secondary combustion chamber. A primary air intake provides air for the primary combustion chamber while hopper heating means are included for heating the hopper to begin combustion of the fuel material therewithin. Air heating means are provided for heating air within the incinerator. The heated air is inserted in at least one of the primary and secondary combustion areas for enhancement of combustion. Baffle means are provided for controlling the flow of gases through the incinerator while an exhaust stack communicating with the gas circulating and flyash collecting chamber is provided for exhausting gases of combustion from the incinerator.

In other aspects of the invention, steam is formed in the incinerator and inserted in the hopper and secondary combustion chambers for enhancement of combustion. In addition, a moving grate may be provided in the ash-collecting area for drawing downwardly and removing ashes from the primary combustion chamber along with any non-combustible materials. The moving grate in the preferred embodiment includes pivotable, endless conveyors which allow passage of even large, bulky objects and which also allow further combustion of the ash material.

The present invention also includes a method for burning rubbish and refuse as fuel including the steps of inserting a quantity of rubbish and refuse in a hopper over a primary combustion chamber of an incinerator, preheating and preliminarily combusting the rubbish and refuse within the hopper at a controlled, slow rate by applying heat to the hopper, and further combusting the rubbish and refuse in the primary combustion chamber while drawing downwardly and removing ashes and any non-combusted materials from the primary combustion chamber and while admitting air to the primary combustion chamber. The method also includes withdrawing gases of combustion from the primary combustion chamber while further combusting those gases successively through a secondary combustion chamber, a gas circulating and flyash collecting chamber and an exhaust stack. Flyash is collected in the gas circulating and flyash collecting chamber while controlling the flow of gases through the incinerator and out the exhaust with a plurality of baffles positioned between at least some of the chambers.

The present incinerator and method provide continuous combustion of varying materials contained in unsorted, unshredded rubbish and refuse typically found in populated areas. Of course, sorted and shredded materials can also be combusted. Clogging of the hopper and combustion areas of the incinerator is prevented while consistently high temperatures of combustion are maintained to enhance complete combustion of all materials and gases which can be burned. The moving grate provides the ability for non-combustible materials to be passed through the apparatus without disruption of the process and also cleans the passing metals to a condition suitable for reuse. Little additional fuel other than the rubbish and refuse is required for operation of the incinerator and process although addition of water in the form of steam has been found to enhance the operation for certain types of materials. The incinerator and method are suitable for use at disposal facilities for large cities and other populated areas and may be incorporated in groups around a single exhaust stack to provide high volume operation.

These and other objects, advantages, purposes and features of the invention will become more apparent from a study of the following description taken in conjunction with the drawings.

BRIEF DESCRIPTION OF THE DRAWINGS

FIG. 2 is an end elevation shown partially in section of the incinerator taken along line II—II of FIG. 1;

FIG. 6 is a fragmentary perspective view of the side of the gas circulating and flyash collecting chamber opposite the side shown in FIG. 5 illustrating the exhaust manifolds receiving the air heated in the incinerator;

FIG. 7 is a fragmentary plan view of the drive train for oppositely rotating the grate conveyors taken along line VII—VII of FIG. 1;

FIG. 8 is a perspective view of the grate conveyors and drive apparatus therefor;

FIG. 9 is an end elevation of one of the grate support plates taken along plane IX—IX of FIG. 1;

FIG. 10 is a fragmentary, perspective view of the perforated baffle and position control cams therefor adjacent the primary air inlet in the incinerator.

DESCRIPTION OF THE PREFERRED EMBODIMENTS

Figure 1:
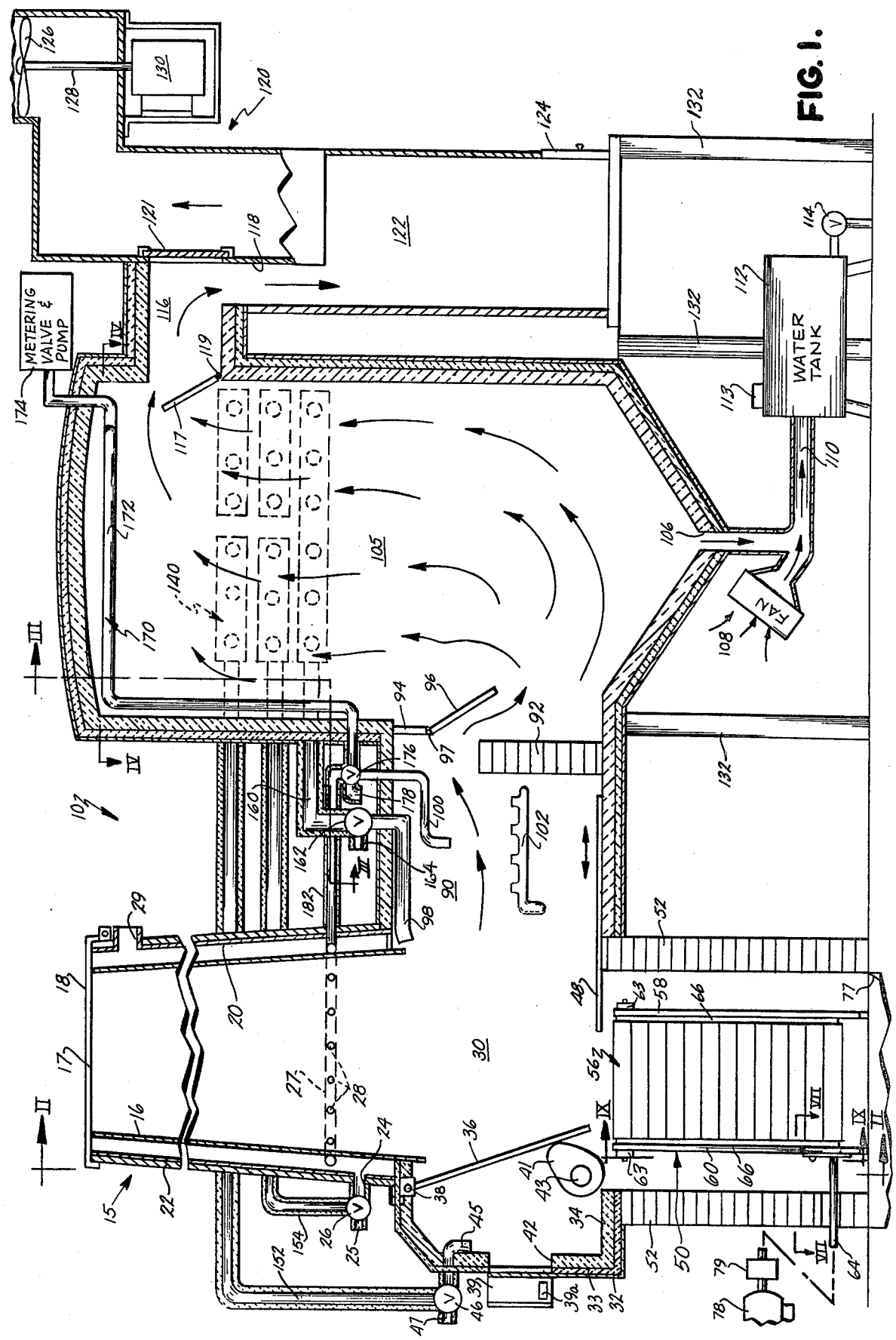
FIG. 1 is a sectional, side elevation of the incinerator of the present invention.
Figure 3:
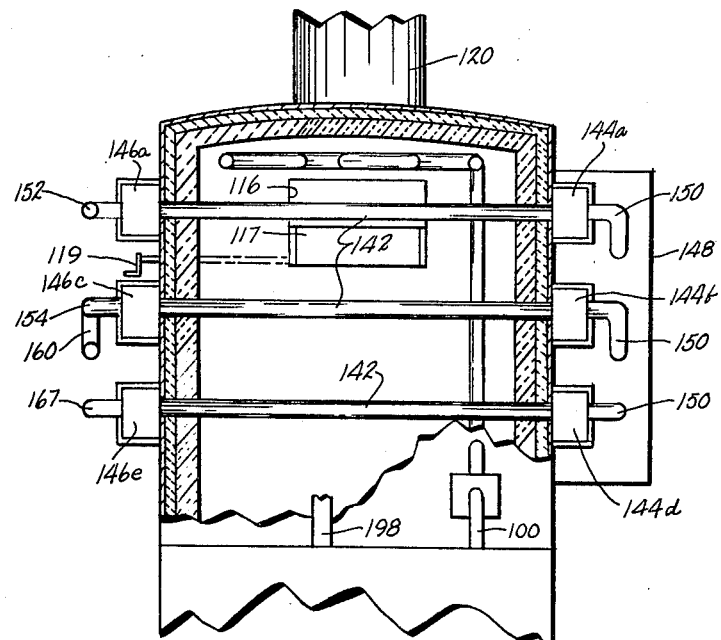
FIG. 3 is a fragmentary elevation of a portion of the incinerator shown in partially in section and taken along line III—III of FIG. 1.

Referring now to the drawings in greater detail, FIG. 1 illustrates the rubbish and refuse burning incinerator 10 of the present invention. Incinerator 10 includes a rubbish and refuse insertion or feed hopper 15 supported over and in alignment with the primary combustion chamber 30 therebelow. Below the primary combustion chamber 30 and in alignment with the hopper 15 is an ash-receiving area 50 including moving grates 54, 56 which receive and draw ashes downwardly from the primary combustion chamber while further combusting the same. A natural draft is created in the incinerator by burning and normal operation and draws gases of combustion laterally from the primary combustion chamber 30 into secondary combustion chamber 90 and into gas circulating flyash collecting chamber 105 successively. The gases of combustion are further burned in these areas and finally exhausted to the atmosphere through an exhaust stack 120. Heat from the incinerator is used to provide heated air with air heating assembly 140 located in the gas circulating and flyash collection chamber 105. Heated air is transferred through insulated tubes from assembly 140 to hopper 15, primary combustion chamber 30 and secondary combustion chamber 90 to enhance combustion in these areas. In addition, steam forming assembly 170 is located in the upper portion of chamber 105 and provides steam for insertion in hopper 15 and secondary combustion chamber 90 to further enhance combustion of certain materials.

As shown in FIGS. 1 and 2, rubbish insertion hopper 15 includes a generally truncated, conical, stainless steel inner shell 16 having a top opening 17 covered by a pivoted, circular lid 18 secured thereover. Cover 18 is normally left open for continuous rubbish insertion although it may be closed to prevent admission of ambient air which could disrupt proper combustion when rubbish insertion is intermittent. Stainless steel shell 16 diverges outwardly and downwardly toward the primary combustion chamber 30 so that inserted rubbish will not clog or become jammed as it progresses toward the combustion chamber. A second truncated, conical, metal shell 20, which is larger than and spaced outwardly from inner shell 16, is included in the hopper to provide a hollow heating jacket through which heated air can be circulated to begin the combustion process of the refuse materials. The heating jacket shell 20 is covered with a layer of insulation 22 such as fiber glass batting or the like to retain heat within the hopper. A hot air insertion tube 24 is provided at the lower end of the heating jacket and includes a butterfly or other similar valve 26 to control insertion of air into the heating jacket from heating tube 154. Valve 26 also includes an outlet 25 for exhaustion of heated air to the atmosphere if heated air insertion into the hopper heating jacket is not required.

The hopper also includes a stainless steel or other non-corrosive metal steam tube 27 formed in the shape of a circle and having a circular cross section which is welded or otherwise secured to the exterior surface of inner shell 16 as shown in FIG. 1. Steam tube 27 includes a plurality of inwardly opening apertures 28 which open through shell 16 to allow insertion of steam from insulated tube 182. Such steam enhances combustion of certain materials within the hopper. The inner shell 16 extends downwardly beyond the top walls of the primary and secondary combustion chambers so that the controlled, downward flow of refuse and rubbish into the combustion areas is unimpeded. Shell 20 has an outlet 29 at its upper end to exhaust the air in the jacket after it rises from the inlet 24. Air entering through intake 24 and exiting through outlet 29 is sufficiently hot to heat rubbish and refuse at the lower end of the hopper to approximately 800°–1000° F. and begin controlled, slow combustion of the refuse. Rubbish and refuse materials enter the hopper at ambient air temperature.

As is also seen in FIG. 1, primary combustion chamber 30 includes a generally rectangular area immediately below the hopper 15 and immediately above the ash-receiving area 50. Chamber 30 includes top, bottom and side walls having a steel or metal plate shell 32, a layer of insulation material 33 immediately interior of the steel shell and a layer of refractory material such as cast Firecrete or fire brick 34 interior of the insulation. The refractory material reflects heat back toward the incinerator interior while the insulation retains heat therewithin and allows expansion and contraction of the refractory material without cracking.

A perforated baffle 36 extends downwardly at an angle from an axle 38 pivotally mounted at the top of the primary combustion chamber. Baffle 36 includes a series of generally vertically extending, spaced slots 40 which allow fresh ambient air entering through primary air intake 42 to pass through the baffle 36. The angled position of baffle 36 advances ashes and non-combustible rubbish and refuse into the ash-receiving area 50 and is controlled by a pair of eliptical cams 41 mounted on rotatable axle 43 including handle 44 (FIGS. 2 and 10). A door or other closure 39 is hingedly secured over primary air intake 42 (FIGS. 1 and 2) and includes a smaller, damper door 39a therewithin which may be opened when door 39 is closed to allow primary air insertion.

Combustion within primary combustion chamber 30 occurs at approximately 1000° F. To maintain that temperature and facilitate combustion, fresh air, heated within the incinerator in assembly 140, is directed to outlet 45 in chamber 30 through insulated, hot air tube 152.

A butterfly or other valve 46 is included to control insertion of the heated air through tube 45 or to exhaust that air to the atmosphere through outlet 47. The addition of heated air through tube 45 facilitates combustion of the rubbish to ashes by preventing cooling of the rubbish material by the air entering through primary air intake 42. The 1000° F. operating temperature of the primary combustion chamber releases carbon monoxide gas which is further combusted and converted to carbon dioxide and other less harmful gases at it travels through successive chambers within the incinerator.

The speed at which rubbish passes through the primary combustion chamber is principally controlled by slide plate 48 extending over the full width of area 50 at the bottom of chamber 30. Plate 48 projects over ash-receiving area 50 to a desired distance in opposition to the lower edge of baffle 36 and is controlled by a handle 49 (FIG. 2) secured thereto and extending through a slot in the side of the incinerator. Once area 50 is completely filled with ashes during operation of the incinerator and fuel material extends upwardly through the primary combustion chamber and the hopper, plate 48 may be slid back out of the way to allow full, normal operation.

Referring now to FIGS. 1, 2, 8 and 9 the primary combustion chamber 30 is supported above the ash-receiving area on brick walls or other supports 52. A pair of opposing, oppositely rotating grate conveyors 54, 56 are positioned below the primary combustion chamber in area 50 and converge downwardly toward one another. Ashes are confined within and on the conveyors between a pair of support plates 58, 60 each of which includes a plurality of apertures therethrough allowing air to be admitted to the ash-receiving area to allow further combustion of the material as it passes downwardly through the conveyors. The operating temperature within the ash-receiving area is approximately 800°–1000° F. and cools towards the lower end of the conveyors.

Figure 8A:
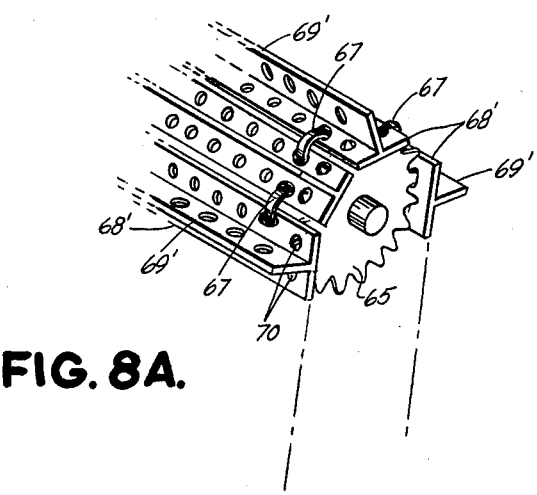
FIG. 8A is a fragmentary, perspective view of a modified version of the grate conveyors.

As is best seen in FIGS. 2 and 8, each conveyor includes a generally horizontally extending upper axle 62 mounted in bearing pillow blocks 63 or the like (FIG. 1) secured to outer surfaces of plates 58, 60. Spaced downwardly from axle 62 is a lower axle 64 supported by rigid support members or braces 66, one brace on either side of each conveyor (FIG. 8). Axles 64 are supported in high temperature-resistant bearings or the like in braces 66 at their lower ends for rotation. A pair of spaced, sprockets 65 are secured on each axle 62, 64 over which is mounted an endless conveyor belt including a series of elongated, rigid metal plates 68 secured together for articulation about sprockets 65 by metal links 67. In the embodiment shown in FIG. 8, alternating metal plates 68 including upstanding rigid, metal flanges 69 which engage and grasp the ashes and uncombusted refuse material and draw that material downwardly and away from the primary combustion chamber at a controlled rate upon movement of the conveyors. Alternately, as shown in FIG. 8A, each metal plate 68' can include an elongated, rigid metal flange 69' for engaging the ashes and refuse material. Also, as shown in FIGS. 8 and 8A, each of the elongated, rigid metal plates 68 or 68' includes spaced apertures 70 receiving the teeth on sprockets 65 for driving the conveyor belts formed from such metal plates.

As shown in FIGS. 2 and 8, the lower ends of conveyors 54, 56 are biased towards one another such that flanges 69 alternate and interengage with one another when the lower conveyor ends are forced together. A biasing linkage 71 includes an L-shaped arm 72 pivotally mounted on support 74 secured to a wall exterior of area 50 and pivotally connected to a link 76 extending through that wall into engagement with one of the axles of one of the conveyors 54, 56. Each conveyor includes such a linkage. Alternately biasing springs could be used in place of linkages 71. As shown in FIG. 2, the force of gravity acting on weights 73 on arms 72 constantly urge and bias links 76 inwardly to force the conveyor ends toward one another. When a large, uncombusted or solid object such as a cement block passes downwardly through the conveyors, it will force the conveyors apart at the lower ends against the force of weights 73 on arms 72 forcing links 76 outwardly along with the lower ends of the conveyors. The ashes and uncombusted materials pass downwardly out of conveyors 54, 56 through passageway 77 to an ash conveyor 78 spaced sufficiently below the ash-receiving area to enable removal of both ashes and bulky, uncombusted articles. Ash conveyor 78 is similar to the conveyors 54, 56 but lies generally horizontally and may include spaced plates supported on chains mounted over sprockets as an alternative. Further, an auger or screw-type conveyor could also be used.

Conveyors 54, 56 are rotated in opposite directions by an electric motor 78 connected through a conventional reduction gear box 79 and drive gear 80 to gears 81, 82. Gears 81, 82 are respectively mounted on the extending ends of lower conveyor axles 64. (See FIGS. 7 and 8). Axles 64 extend through one of the brick support walls 52 on one side of the ash-receiving area 50 in slots provided through that wall. The axles include conventional U-joints 83 and slip joints 84 allowing gears 81, 82 to remain in driving engagement with one another but axle portions 64 and 64A to pivot outwardly away from one another (shown in phantom in FIG. 7) should a large object pass between the conveyors. Slip couplings 84 include axle portion 64A axially slidably mounted in receptacles 84A in those couplings. The ends of axle portion 64A are splined or non-circular and maintain driving rotation of the axle but allow longitudinal sliding of the axle portion should axle portion 64 move outwardly as shown in FIG. 7. Slip coupling 84 is pivotally mounted on an axle stud extending from the center of each of the drive gears 81, 82 as shown. Thus, opposite rotation of the conveyors is maintained even when forced apart by large, uncombusted objects or the like passing downwardly therethrough.

As is shown in FIG. 9, pivotal guard plates 86 are pivotally secured over axle 64 and axle pivot slots 85 in support plate 60 and pivot upon pivotal movement of conveyors 54, 56 to prevent ashes from passing outwardly through the support plates. These plates also cover pivot slots 85 to retain heat within the ash-receiving area.

Referring again to FIG. 1, gases of combustion along with some small particles of ash, or flyash, are drawn laterally away from the primary combustion chamber into the secondary combustion chamber by the natural draft within the incinerator during the combustion process. The secondary combustion chamber 90 is a lateral extension of the primary combustion chamber 30 and provides further combustion of the carbon monoxide and other gases resulting from the primary combustion process. A flow deflection wall 92 extends upwardly from the bottom wall of the secondary combustion chamber 90 and forces the flow of gases through the incinerator up and over that wall while a baffle 94 extends downwardly from the upper wall at the extreme end of the secondary combustion chamber adjacent to and generally in opposition to the deflecting wall 92. Baffle 94 includes a section 96 secured to a rotatable rod 97 extending through the side wall of the gas circulating and flyash collecting chamber for control of the position of baffle section 96.

To facilitate combustion within the secondary combustion chamber, heated air from air heating assembly 140 is inserted therein through a stainless steel or other heat resistant tube 98 while steam from steam-forming assembly 170 is inserted through a similar tube 100. The heated air prevents cooling of the combustion gases as they pass to the secondary combustion chamber and provides additional oxygen for further combustion. Steam from tube 100 provides moisture which provides further heat and control for further combustion of the gases. In addition, either one or a pair of auxilliary, stainless steel natural gas burners or the like 102 may be mounted within the secondary combustion area for further combustion of the gases resulting from combustion of rubbish materials such as rubber, grease, oil and the like which leave many particles in their combustion gases for further combustion. The use of heated air, steam and, if necessary, auxilliary burning maintains the combustion within chamber 90 at approximately 1800° F.

After the combustion gases have passed through chamber 90, they are forced downwardly and then immediately upwardly into vertically extending gas circulating and flyash collecting chamber 105 (FIGS. 1, 2, 3 and 4). The walls of chamber 105 are similar to those forming the primary and secondary combustion chambers and include refractory material over a layer of insulation and a metal plate shell. The circulation of gases around baffles 94, 96 and over deflecting wall 92, followed by upward movement of the gases in chamber 105 creates a vacuum in the lower area of chamber 105 allowing flyash to settle out in the bottom of that chamber. Such vacuum is enhanced by a vacuum created in passageway 106 leading from the bottom of the chamber 105. A fan 108 positioned on a branch of passageway 106 forces air into passageway 110 which correspondingly creates a vacuum in passageway 106 drawing out the flyash from chamber 105. Passageway 110 leads to a tank 112 containing water and having an inlet 113 and a valved outlet 114. The flyash containing gases are combined with the water in the tank 112 to form a mixture which can be removed via valve 114. The above flyash removal process helps purify the combustion gases as they pass through chamber 105 before exiting through exhaust stack 120.

As the gases pass upwardly in chamber 105 they pass over air heating tubes 142 in assembly 140 and steam-forming tubes 172 in apparatus 170 and out passage 116 extending laterally from the upper portion of chamber 105. Passage 116 communicates with a downwardly extending passage 118 leading to an exhaust stack support chamber 122 beneath exhaust stack 120. Control of the flow of combustion gases into passageways 116, 118 is by a movable baffle 117 secured to a pivotable rod 119 extending through the side of the gas circulating chamber 105 (see FIG. 2). After passing through passageway 118, the directional flow is again reversed such that the gases pass upwardly and out through exhaust stack 120 as is best seen in FIG. 1. This reverse in direction directs flyash downwardly and creates a vacuum in the bottom portion of stack support 122 collecting further flyash which may be removed from that area through door 124. Movement of the gases upwardly through stack 120 is facilitated by a fan blade 126 mounted on a shaft 128 which in turn is rotated by electric motor 130 mounted below a portion of the stack. Fan 126 is typically used only during start-up or when atmospheric conditions such as high humidity might impede or reduce proper draft through the incinerator. The combustion gases are at an approximate temperature of 500°–1000° F. as they pass out through exhaust stack 120. Depending on moisture content and materials included in the rubbish being burned.

Upon start-up of the incinerator 10, baffles 96, 117 and an additional door 121 mounted for slidable movement over an aperture stack 120 communicating with passageway 116 are all opened to allow unrestricted flow through the apparatus. Door 121 may be slid open to bypass passageway 118 and chamber 122 to facilitate start-up of the incinerator and thereafter closed via a handle extending out of the stack. Once operating temperatures as described above are obtained in the apparatus, baffles 96, 117 and door 121 may be at least partially closed to control the rate of combustion and thus, the temperatures within the various chambers. Typically, door 121 is fully closed for normal operation. Chambers 90, 105, 122 and stack 120 are all supported above the ground surface on legs 132 (FIG. 1) to provide room under the primary combustion chamber for the ash-receiving area 50 and movable grates.

As is best seen in FIGS. 1, 3, 5 and 6, air-heating assembly 140 includes a plurality of air-heating tubes extending transversely across and through gas circulating and flyash collecting chamber 105 between opposite sides thereof. Tubes 142 are formed from stainless steel or another high temperature, non-corrosive material and extend between manifolds 144a, 144b, 144c and 144d and exhaust manifolds 146a, 146b, 146c, 146d and 146e. Air is fed into tubes 142 from an air intake manifold 148 on one side of the gas circulating and flyash collecting chamber exterior, which manifold is connected through four intake pipes 150 to the respective manifolds. A butterfly or other similar valve 156 is included in each pipe 150 to control the air flow from intake manifold 148 to the respective manifolds 144, 146 connected to pipes 142. A fan 158 is also included to force air into the intake manifold and on through the various pipes leading to various portions of the incinerator. On the opposite side, insulated exhaust tubes 152, 154 direct heated air to valves 46, 26 respectively, as mentioned above in connection with the hopper 15 and primary combustion chambers 30. In addition, an insulated hot air tube 160 leads from exhaust manifold 146c to a valve 162 controlling hot air flow through tube 98 to the secondary combustion chamber 90. An outlet 164 from valve 162 is provided should hot air not be required in chamber 90. The ability to exhaust pipes 152, 154 and 160 to the atmosphere through outlets 25, 47 and 164 allows air flow to continue through tubes 142 within the incinerator to prevent their deterioration from the heat present therein. The separate intake and exhaust manifolds also allow individual control of air directed to the various portions of the incinerator mentioned above using valves 26, 46, 162 as well as valves 156. In addition, heated air exhaust tubes 166, 167 extending from exhaust manifolds 146a and 146e can be directed to other uses such as for the heating of water for the building in which the incinerator is housed or the like. The tubes and manifolds in the hot air heating assembly on the exterior of the incinerator are all preferably covered with insulation to prevent injury and to retain heat therein as it is directed to other parts of the incinerator.

Figure 4:
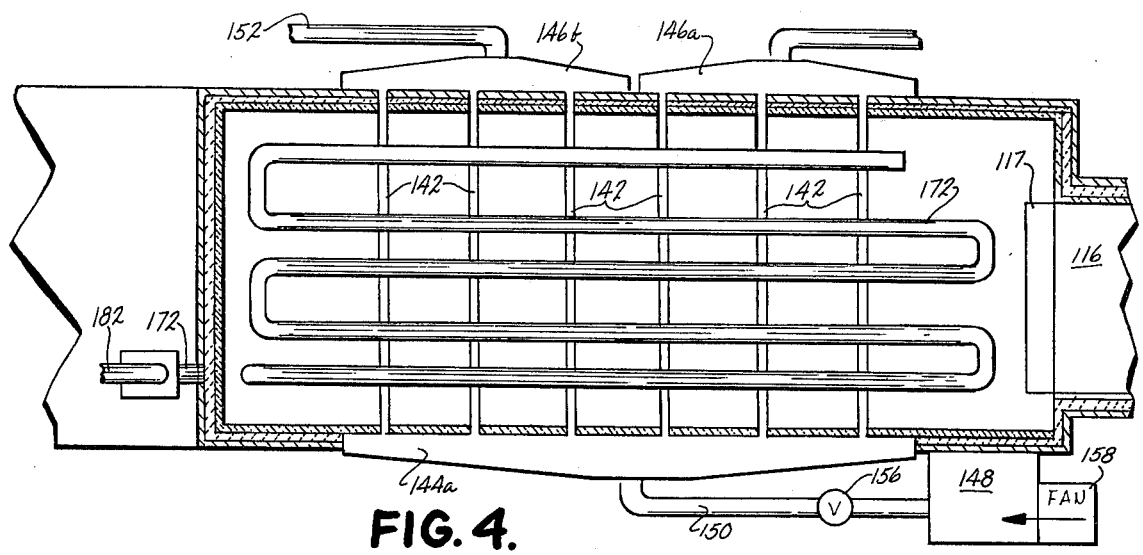
FIG. 4 is a fragmentary plan view taken along plane IV—IV of FIG. 1.
Figure 5:
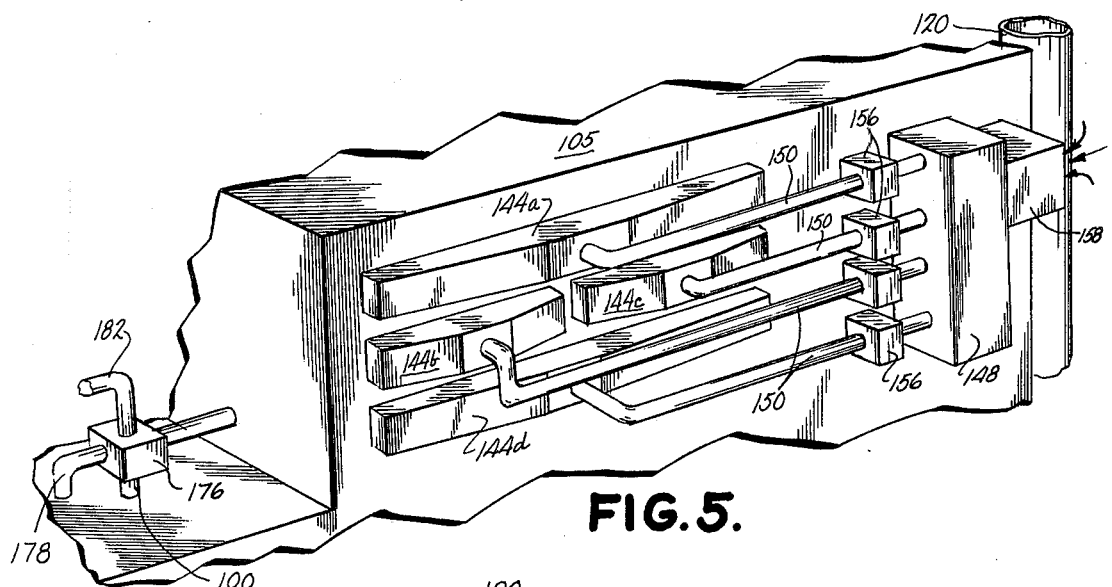
FIG. 5 is a fragmentary perspective view of one side of the gas circulating and flyash collecting chamber illustrating the air intake apparatus for heating fresh air in the incinerator.

Also included in the uppermost portions of gas circulating and flyash collecting chamber 105 is a steam forming assembly 170 including a continuous high temperature resistant, stainless steel or other tube 172 formed in a sinuous pattern as shown in FIG. 4. Tube 172 is connected to a conventionally known pump and metering valve 174 along with a source of water to periodically and intermittently feed a controlled, small amount of water in drop form or the like into pipes 172 under pressure which is immediately converted to steam within tubes 172 by the heat in chamber 105. Tube 172 extends continuously downwardly and out through a forward wall of chamber 105 to a valve 176 having an outlet 178 for exhausting steam to atmosphere. Valve 176 can also direct steam into hopper 115 through tube 182 and/or into secondary combustion chamber 90 through tube 100. For certain fuels such as rubber and the like, steam will be inserted through tubes 182 and 100 simultaneously. However, steam may also be fed to either tube 182 or 100 individually. Should no steam be required for complete combustion of gases within the incinerator, steam flow through tube 172 is maintained and exhausted to atmosphere through outlet 178 to prevent degradation of the tubes within the incinerator.

Figure 11:
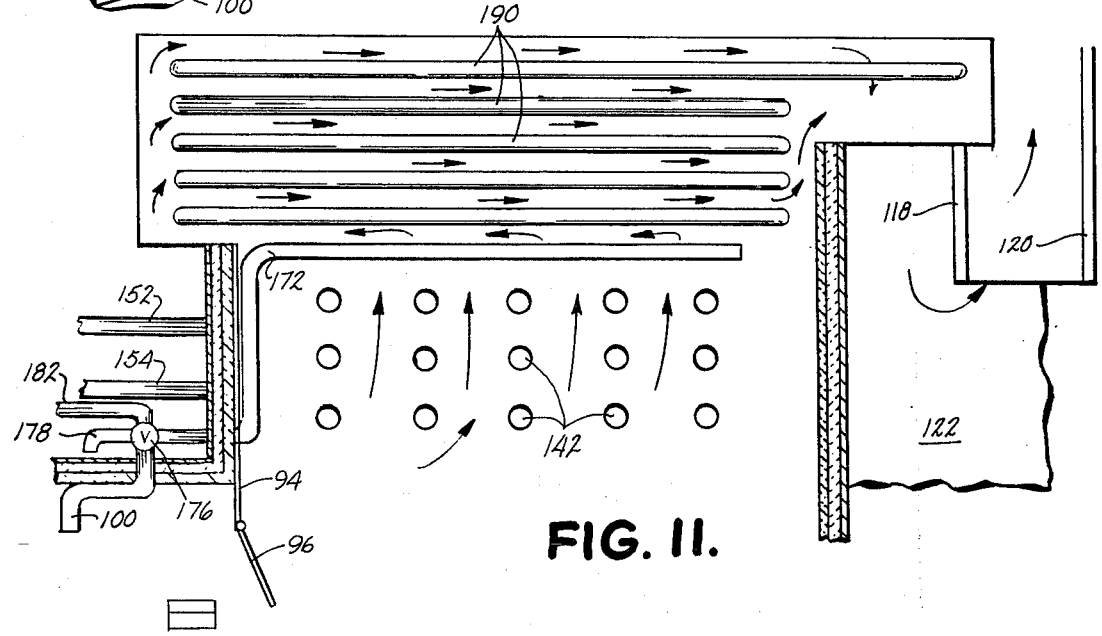
FIG. 11 is a fragmentary, sectional side elevation of a modified version of the incinerator including a boiler tube assembly therein.

As shown in FIG. 11, additional heat within the gas circulating and flyash collecting chamber 105 may be utilized by including a plurality of boiler tubes 190 therein. Water may be circulated through such tubes and heated by the gases of combustion within the incinerator to supply hot water or steam for heating or power generation or other purposes outside the incinerator. Thus, the energy provided by the combustion of rubbish and refuse may be put to optimum use.

Preferably, a suitable size for the incinerator of the present invention has been found to include a primary and secondary combustion chamber approximately four feet wide, four feet high and eight feet long communicating with a gas circulating and flyash collecting chamber approximately four feet wide, three feet long and six to eight high. Of course, the dimensions of the various chambers and passageways can be modified as will be appreciated by one skilled in the art for purposes of increasing or decreasing the capacity of the incinerator.

DESCRIPTION OF THE PREFERRED METHOD

As will now be appreciated, the invention provides a method for burning a combusting rubbish and refuse which need not be sorted or shredded before insertion in the incinerator. The rubbish and refuse provides fuel for the combustion process while the heat produced can be used to facilitate complete combustion within the process and also provide energy for other purposes as described above.

A quantity of rubbish and refuse is inserted in hopper 15 and preliminarily heated and slowly combusted at a controlled rate as it passes downwardly through that hopper by heat applied from air inserted in heating jacket 20 surrounding the hopper. Until operating temperatures in the incinerator are obtained, the primary air intake 42, baffle 96, 117 and door 121 are opened wide to initiate the natural draft obtained through the incinerator during operation. As temperatures reach the operating values, these various doors are at least partially closed to maintain the proper temperature and combustion rate.

Steam may be inserted in the hopper through tube 27 from that produced in tube 172 in chamber 105. Such steam adds heat and moisture to the rubbish and combustion gases thereby enhancing combustion throughout the process. As the fuel passes to primary combustion area 30, temperatures reach approximately 1000° F. The burnt material and ashes along with any uncombusted material passes downwardly into ash-receiving area 50 as guided and controlled by baffle 36 and slide plate 48. Oppositely rotating moving grate conveyors 54, 56 draw the ashes and uncombusted materials downwardly from the primary combustion chamber while admitting air through plates 58, 60 and the conveyors themselves to further combust the materials before it passes out of the conveyors through passages 77 to the ash conveyor 78. Uncombusted materials such as metals, including steel, copper, brass, aluminum and the like have all combustible materials burned therefrom during the combustion process and are provided in a clean, reuseable form available for recycling on the ash conveyor. Low melting point metals such as tin drop through and harden in reuseable lumps or chunks. The outwardly yieldable conveyors prevent clogging of the material as it passes through the incinerator even for large, bulky objects such as bicycles, cinder blocks or other manufactured items which are not reduced in the furnace.

Gases of combustion are drawn from the primary combustion chamber into secondary combustion chamber 90 by the natural draft of the incinerator. Such combustion continues on through gas circulating and flyash collecting chamber 105 and even partially as the gases continue through the exhaust stack 120. Combustion may be enhanced in chamber 90 by the addition of steam and additional heated air or the use of auxilliary burners 102. Deflection of the gases over wall 92 and under baffle 96 and then upwardly through chamber 105 creates a circulating motion causing a vacuum in the lower portion of chamber 105 allowing settling of flyash particles from the gases. This settling is facilitated by withdrawal of the particles through passageway 106 in the manner described above. The combusted gases pass over air heating assembly 140 and steam forming assembly 170 to heat air and produce steam used in the process or in other applications. Additional flyash may be collected in chamber 122 to further cleanse the gases before they are exhausted through stack 120.

The above incinerator may be combined with others around a larger, central exhaust stack to provide high volume combustion of large quantities of refuse and rubbish. The ash conveyors 78 may be directed to a common disposal area where reuseable metals may be removed. In addition, conveyors may be used to automatically feed rubbish and refuse into the hopper or a plurality of hoppers 15.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A method for burning rubbish and refuse as fuel comprising the steps of:
    (1) inserting a quantity of rubbish and refuse in a hopper over a primary combustion chamber of an incinerator;
    (2) preheating and preliminarily combusting said rubbish and refuse within said hopper at a controlled, slow rate by applying heat to said hopper while said rubbish and refuse moves downwardly through said hopper;
    (3) further combusting said rubbish and refuse in the primary combustion chamber while drawing and removing ashes and any uncombusted materials downwardly from the bottom of said primary combustion chamber and while admitting air to said primary combustion chamber;
    (4) withdrawing the gases of combustion away from said hopper and primary combustion chamber while further combusting those gases as those gases are removed successively through a secondary combustion chamber, a gas circulating and flyash collecting chamber, and an exhaust, said withdrawal and movement of gases occurring with a natural draft through the successive areas of said incinerator without reverse flow through said chambers and hopper; and
    (5) collecting flyash in the gas circulating and flyash collecting chamber while controlling the flow and natural draft of gases through said incinerator and out the exhaust with a plurality of baffles positioned between at least some of said chambers whereby generally complete combustion of the combustible materials in the rubbish and refuse as well as gases of combustion resulting therefrom is obtained.

2. The method of claim 1 including inserting steam formed with steam forming apparatus in said incinerator into said hopper to add moisture and heat to said fuel material.

3. The method of claim 2 including also inserting said steam into said secondary combustion chamber.

4. The method of claim 1 wherein said preheating said rubbish and refuse includes heating air in a portion of said incinerator and directing said heated air into a heating jacket surrounding said hopper.

5. The method of claim 4 further including inserting a portion of said heated air into at least one of said primary and secondary combustion chambers to facilitate combustion therein.

6. A method for burning rubbish and refuse as fuel comprising the steps of:
    (1) inserting a quantity of rubbish and refuse in a hopper over a primary combustion chamber of an incinerator;
    (2) preheating and preliminarily combusting said rubbish and refuse within said hopper at a controlled, slow rate by applying heat to said hopper;
    (3) further combusting said rubbish and refuse in the primary combustion chamber while drawing and removing ashes and any uncombusted materials downwardly from the bottom of said primary combustion chamber and while admitting air to said primary combustion chamber;
    (4) withdrawing the gases of combustion while further combusting those gases successively through a secondary combustion chamber, a gas circulating and flyash collecting chamber, and an exhaust;
    (5) collecting flyash in the gas circulating and flyash collecting chamber while controlling the flow of gases through said incinerator and out the exhaust with a plurality of baffles positioned between at least some of said chambers whereby generally complete combustion of the combustible materials in the rubbish and refuse as well as gases of combustion resulting therefrom is obtained; and
    said step of controlling the flow of gases through said incinerator including opening a first baffle between the secondary combustion chamber and gas circulating and flyash collecting chamber and a second baffle between said gas circulating and flyash collecting chamber and said exhaust until said incinerator reaches operating temperatures and thereafter moving said baffles to reduce the flow of gases through said incinerator to maintain said operating temperatures.

7. The method of claim 6 including aiding the natural movement of gases through said incinerator by drawing air and combustion gases through said incinerator with a fan in said exhaust.

8. The method of claim 6 including directing gases of combustion over a flow deflection wall extending upwardly from the bottom of said secondary combustion chamber, downwardly past said first baffle, upwardly through said gas circulating and flyash collecting chamber and laterally past said second baffle whereby flyash is deposited in said last mentioned chamber and said gases are generally completely combusted before leaving said incinerator.

9. A method for burning rubbish and refuse as fuel comprising the steps of:
(1) inserting a quantity of rubbish and refuse in a hopper over a primary combustion chamber of an incinerator;
(2) preheating and preliminary combusting said rubbish and refuse within said hopper at a controlled, slow rate by applying heat to said hopper;
(3) further combusting said rubbish and refuse in the primary combustion chamber while drawing and removing ashes and any uncombusted materials downwardly from the bottom of said primary combustion chamber and while admitting air to said primary combustion chamber;
(4) withdrawing the gases of combustion while further combusting those gases successively through a secondary combustion chamber, a gas circulating and flyash collecting chamber, and an exhaust;
(5) collecting flyash in the gas circulating and flyash collecting chamber while controlling the flow of gases through said incinerator and out the exhaust with a plurality of baffles positioned between at least some of said chambers whereby generally complete combustion of the combustible materials in the rubbish and refuse as well as gases of combustion resulting therefrom is obtained; and drawing and removing ashes from said primary combustion chamber with a pair of oppositely rotating, downwardly converging conveyors which are below and open to said primary combustion area, and biasing the lower ends of said conveyors toward one another whereby uncombustible refuse will urge said conveyors apart and pass therethrough.

10. The method of claim 9 including admitting air to the area including said conveyors to further combustion within that area.

11. The method of claim 1 including drawing flyash from said gas circulating and flyash collecting chamber with a vacuum.

12. The method of claim 1 including burning additional fuel in at least one burner located in said secondary combustion area to facilitate combustion therein.

13. A method for burning rubbish and refuse as fuel comprising the steps of:
(1) inserting a quantity of rubbish and refuse in a hopper over a primary combustion chamber of an incinerator;
(2) preheating and preliminarily combusting said rubbish and refuse within said hopper at a controlled, slow rate by applying heat to said hopper;
(3) further combusting said rubbish and refuse in the primary combustion chamber while drawing and removing ashes and any uncombusted materials downwardly from the bottom of said primary combustion chamber and while admitting air to said primary combustion chamber, said step of drawing and removing ashes and any uncombusted materials downwardly from the bottom of said primary combustion chamber including engaging, grasping and moving said ashes and uncombusted materials downwardly and away from said primary combustion chamber with a pair of oppositely rotating, moving grate means positioned adjacent one another beneath said primary combustion chamber;
(4) withdrawing the gases of combustion while further combusting those gases successively through a secondary combustion chamber, a gas circulating and flyash collecting chamber, and an exhaust; and
(5) collecting flyash in the gas circulating and flyash collecting chamber while controlling the flow of gases through said incinerator and out the exhaust with a plurality of baffles positioned between at least some of said chambers whereby generally complete combustion of the combustible materials in the rubbish and refuse as well as gases of combustion resulting therefrom is obtained.

* * * * *

UNITED STATES PATENT AND TRADEMARK OFFICE
CERTIFICATE OF CORRECTION

PATENT NO. : 4,205,614
DATED : June 3, 1980
INVENTOR(S) : Lewis D. Good

It is certified that error appears in the above-identified patent and that said Letters Patent are hereby corrected as shown below:

```
In the Title:
"COMBUSTION FOR RUBBISH AND REFUSE" should be
--COMBUSTION METHOD FOR RUBBISH AND REFUSE--

Column 5, line 24:
"at" should be --as--

Column 6, line 30:
"including" should be --include--

Column 11, line 67, Claim 1:
"removed" should be --moved--
```

Signed and Sealed this

Twenty-first Day of October 1980

[SEAL]

Attest:

Attesting Officer

SIDNEY A. DIAMOND

Commissioner of Patents and Trademarks